United States Patent [19]

Bosher

[11] 4,324,052

[45] Apr. 13, 1982

[54] SOLVENT AND HEAT RECOVERY SYSTEM FOR DRYING OVEN

[76] Inventor: John L. Bosher, 2469 Emory La., NE., Marietta, Ga. 30067

[21] Appl. No.: 184,288

[22] Filed: Sep. 5, 1980

[51] Int. Cl.³ .............................................. F26B 3/04
[52] U.S. Cl. ........................................ 34/27; 34/35; 34/77; 34/86
[58] Field of Search ............... 62/335; 55/259; 118/61; 427/372.2; 68/18 C, 18 F; 34/77, 86, 35, 78, 79, 82, 27, 32

[56] References Cited

U.S. PATENT DOCUMENTS

| | | | |
|---|---|---|---|
| 3,203,110 | 8/1965 | Fuhring et al. | 34/78 |
| 3,256,613 | 6/1966 | Moulthrop | 34/78 |
| 3,831,294 | 8/1974 | Freze | 34/77 |
| 3,984,050 | 10/1976 | Gustafsson | 62/238.6 |
| 4,155,726 | 5/1979 | Steinmeyer | 55/259 |
| 4,185,397 | 1/1980 | Hutzenlaub | 34/77 |
| 4,217,115 | 8/1980 | Palmer | 68/18 F |
| 4,247,991 | 2/1981 | Mehta | 34/86 |

FOREIGN PATENT DOCUMENTS 204817 12/1956 Australia .

Primary Examiner—Larry I. Schwartz

Attorney, Agent, or Firm—George M. Thomas

[57] ABSTRACT

The hot, saturated air is moved from a drying oven chamber through a substantially closed circuit first in a heat extraction path through a series of cooling stages to condense the solvent from the air, and then in a heat collection path in a cross-flow heat exchange relationship through some of the cooling stages to recover some of the heat, and the dried air is moved back into the drying oven. The heat extraction path extends generally in a downward sloped direction toward a solvent storage tank, and the solvent is condensed as it reaches the lower end of the path. A compound, multiple stage refrigeration system moves a first refrigerant fluid through a condenser coil in the heat collection path to impart heat to the air and then through an expansion valve and through a refrigerant-to-refrigerant heat exchanger to absorb heat, and moves a second refrigerant fluid through the refrigerant-to-refrigerant heat exchanger to give up its heat and then through an expansion valve and through an evaporator in the heat extraction path to absorb heat from the air. Makeup air to the substantially closed system can be provided and moves through a cooling coil and a desiccant dehumidifier in the heat collection path.

8 Claims, 3 Drawing Figures

SOLVENT AND HEAT RECOVERY SYSTEM FOR DRYING OVEN

BACKGROUND OF THE INVENTION

This invention relates to a method and apparatus for recovering heat and solvent from the hot solvent saturated air in drying ovens of the type utilized to dry solvent base and paint coatings on various articles by applying hot dry air to the articles.

Solvent base paints and coatings usually contain about 50% organic solvents which evaporate from the paint or coating during the drying process after the paint or coating has been applied to an article. In many industrial painting and coating processes the articles are painted or coated and then placed in a drying oven where hot dry air is applied to the article to accelerate the drying procedure. When the air in the oven becomes saturated with solvent, the air must be exhausted and a new supply of hot dry air supplied to the oven to continue the drying process.

When the saturated air is exhausted from the oven to the atmosphere, a substantial amount of solvent and heat is wasted, and the solvent is usually considered to be an atmospheric pollutant. Additionally, the flammability of the solvent tends to create a fire hazard in and about the manufacturing plant.

In order to comply with government pollution control regulations which recently have been established, some industrial painting and coating plants have been equipped with thermal fume incinerators for burning the exhaust gases from paint and coating drying ovens. The thermal incinerators usually require temperatures in excess of 1200° F. in order to ignite the solvent vapor, and usually include a structure that supplies an auxiliary fuel to the oven exhaust gases, such as natural gas, to cause incineration of the solvent fumes. Of course, this requires even additional energy.

In order to avoid the waste of heat energy and in order to avoid expelling solvent vapor to the atmosphere as a pollutant, it is desirable to extract both the heat and solvent vapor from the air exhausted from a drying oven.

SUMMARY OF THE INVENTION

Briefly described, the present invention comprises a solvent and heat recovery system for drying ovens, wherein the hot, solvent vapor saturated air from the drying oven is moved through a substantially closed circuit, first through a heat extraction path through a series of cooling stages to lower the temperature of the air and to condense the solvent vapors from the air, and then in a heat collection path in a cross-flow heat exchange relationship with some of the cooling stages of the heat extraction path to recover some of the heat, and then back to the drying oven, where additional heat is supplied to the air as it enters the drying oven. The heat extraction path of the closed air circuit extends in a downward sloped direction toward a solvent storage tank, and the solvent vapor is condensed as it approaches the storage tank.

A compound, multiple stage refrigeration system includes a high-temperature sub-system which moves its refrigerant fluid through condenser coils positioned in the heat collection path of the substantially closed circuit air duct system to give up heat to the air moving through the heat collection path, and the refrigerant fluid then moves on through an expansion valve and through a refrigerant-to-refrigerant heat exchanger to absorb heat. A low temperature sub-system of the compound, multiple stage refrigeration system moves its refrigerant fluid through the refrigerant-to-refrigerant heat exchanger to give up heat and the refrigerant fluid then moves on through an expansion valve and through an evaporator coil positioned in the heat extraction path which extracts heat from the air moving through the heat extraction path.

The air duct system includes means for exhausting a portion of the air from the heat collection path and a means for introducing makeup air to the heat collection path, and a desiccant bed dehumidifier through which the makeup air passes. A heat wheel heat exchanger absorbs heat from the exhaust air and gives up heat to the makeup air.

Thus, it is an object of this invention to provide a method and apparatus for recovering solvent and heat from the hot solvent saturated air of a drying oven, with maximum thermal efficiency and substantially without exhausting solvent vapor to the atmosphere.

Another object of this invention is to provide a system for drying solvent base coatings applied to articles in a hot drying oven, which does not require the addition of any dilution or makeup air to the gases exhausted from the drying oven during the drying process, and wherein the solvent vapor in the air exhausted from the drying oven is condensed and collected.

Other objects, features and advantages of the present invention will become apparent upon reading the following specification, when taken in conjunction with the accompanying drawings.

DETAILED DESCRIPTION

Figure 1:
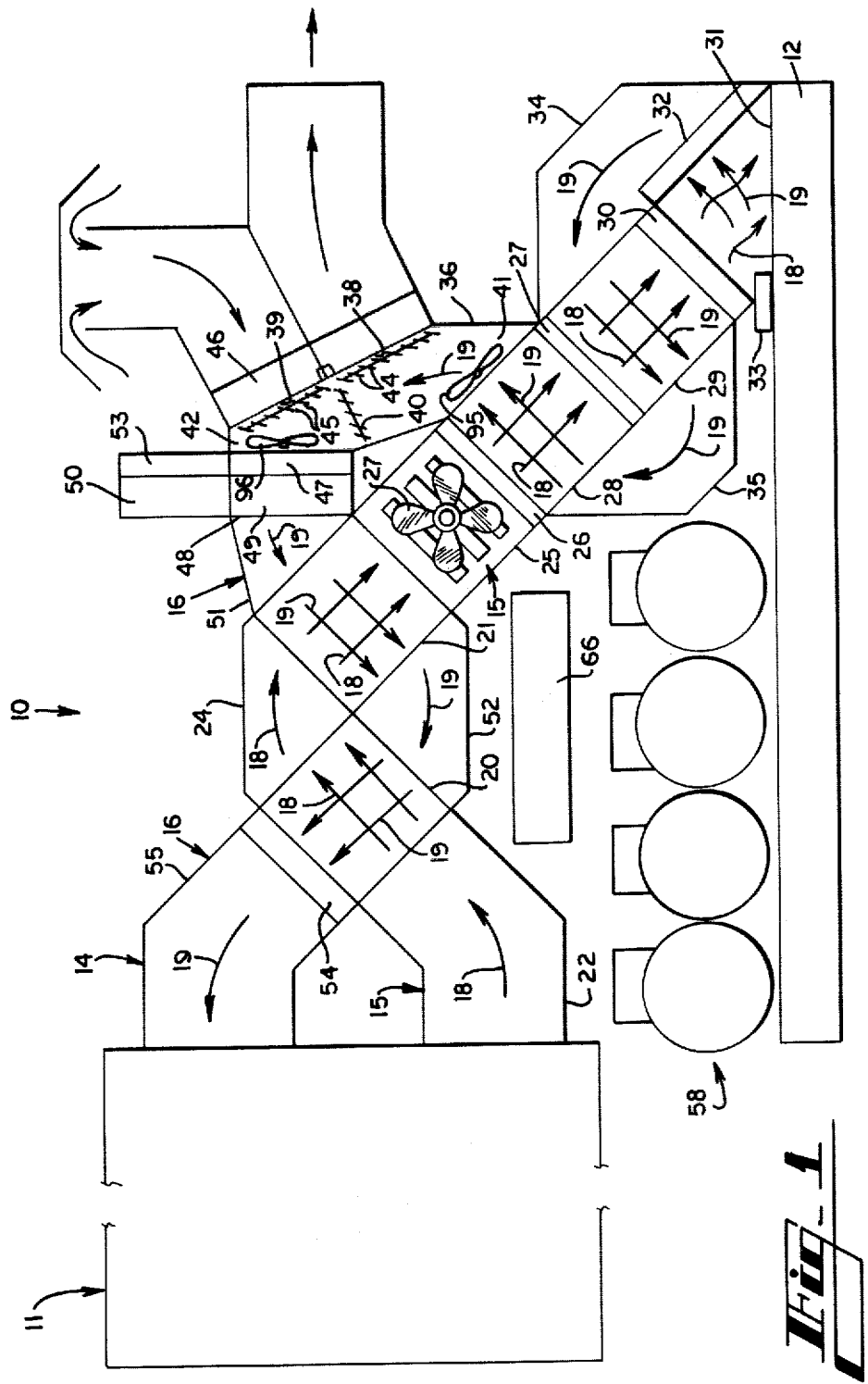
FIG. 1 is a side cross-sectional view, in schematic form, of the solvent recovery system.
Figure 2:
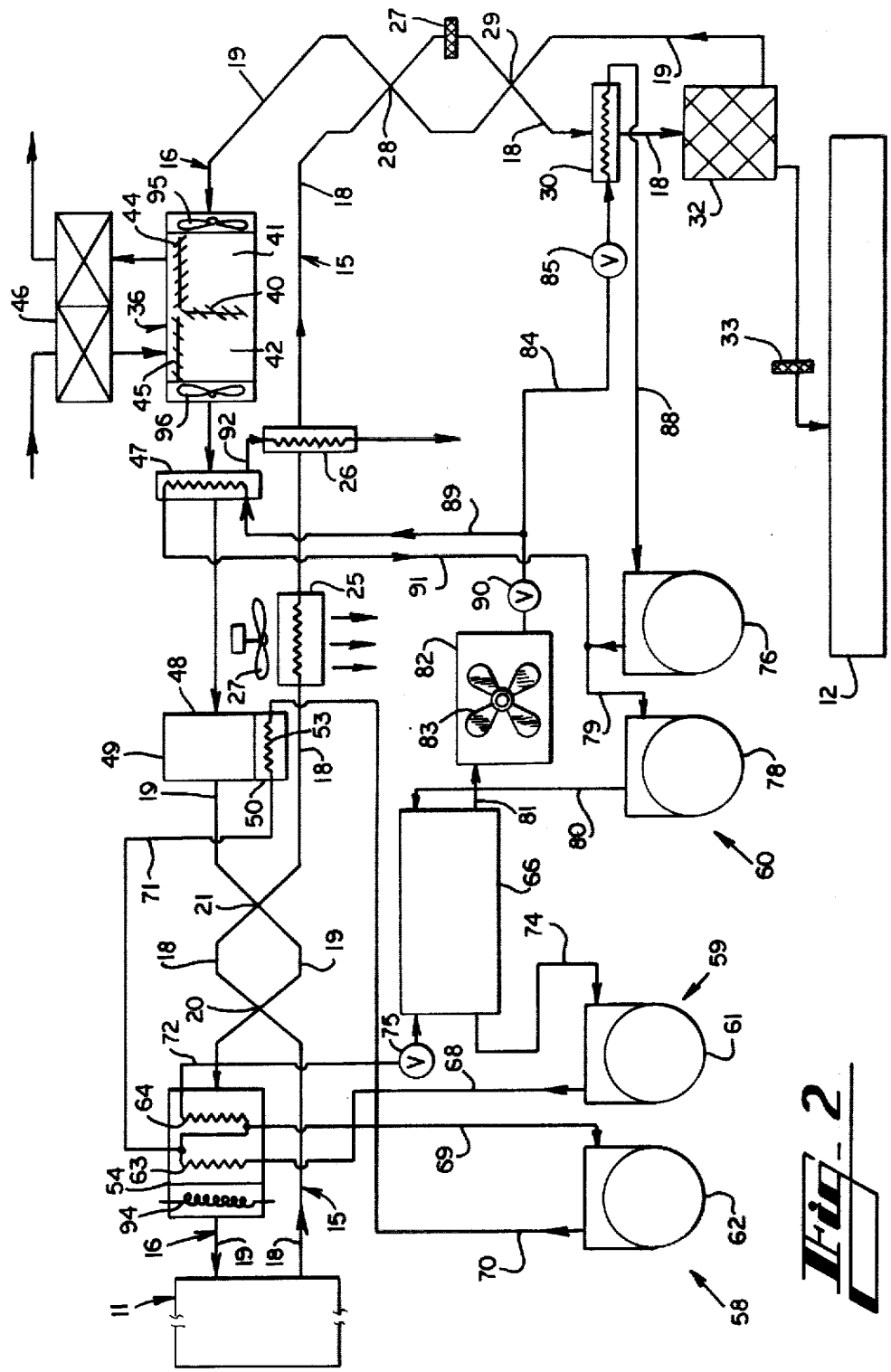
FIG. 2 is a schematic diagram of the fluid flow system of the solvent recovery system.

Referring now in more detail to the drawings, in which like numerals indicate like parts throughout both views, FIG. 1 illustrates the solvent and heat recovery system 10 which is utilized to extract hot air saturated with solvent vapor from an oven 11 and to condense the solvent and store the solvent in a storage tank 12. Oven 11 can be a "batch" oven or an open-ended oven through which articles are conveyed. In either case, the oven 11 is supplied with hot dry air to dry the wet paint or coating applied to the articles in the oven, and after the air becomes saturated with the solvent vapor from the paint or coating the air is exhausted from the oven. The recovery system 10 comprises a substantially closed circuit air duct system in communication with oven 11. Air duct system 14 includes heat extraction path 15 and heat recovery or collection path 16. The flow arrows 18 illustrate the direction of air flow through the heat extraction path while the flow arrows 19 illustrate the direction of flow of air through the heat recovery path 16.

A first pair of cross-flow heat exchangers 20 and 21 are arranged in series, and duct 22 communicates at one of its ends to the exhaust opening of drying oven 11 and with the first cross-flow heat exchanger 20. Duct work 24 extends between crossflow heat exchangers 20 and 21 and directs the hot saturated air from the first cross-flow heat exchanger 20 to the second cross-flow heat exchanger 21. An air coil 25 and fan 27 are positioned downstream of cross-flow heat exchanger 21, evaporator drain coil 26 is positioned downstream of air coil 25, and a second pair of cross-flow heat exchangers 28 and 29 are placed in series downstream of evaporator drain coil 26. Evaporator coil 30 is located downstream of the cross-flow heat exchanger 29 and communicates with opening 31 of solvent storage tank 12. Demister 32 is located upstream of the opening 31 and functions to collect droplets of condensed solvent at the opening 31 and droplets drain into the opening 31. In-line dryer 27 is positioned between the heat exchangers 28 and 29 and comprises a desiccant bed dryer of granular material such as silica gel. Also, a similar in-line dryer 33 is positioned in the flow path between demister 32 and solvent storage tank 12.

Heat recovery path 16 begins at demister 32 with duct work 34 that directs the air from demister 32 first in a cross-flow relationship through cross-flow heat exchanger 29, and duct work 35 directs the air from cross-flow heat exchanger 29 in a cross-flow relationship through cross-flow heat exchanger 28. The air exhausted from cross-flow heat exchanger 28 moves into mixing chamber 36. Mixing chamber 36 defines air exhaust opening 38, makeup air inlet opening 39, and by pass louver control valve 40 that divides mixing chamber 36 into exhaust section 41 and makeup section 42. Exhaust and makeup louver control valves 44 and 45 extend across exhaust air opening and makeup air inlet opening 38 and 39 and heat wheel 46 is located outside louver control valves 44 and 45. Heat wheel 46 comprises a lattice of heat conducting material coated with moisture absorption material and heat wheel 46 is rotated by a motor (not shown) when louver control valves 44 and 45 are open and when control valve 40 is partially closed. With this arrangement, when 100% of the dried air is not being recirculated from exhaust section 41 to makeup section 42 and makeup air is to be added to the air flow system a portion of the air moving through the heat extraction path is exhausted to the atmosphere through exhaust louver valve 44 and air exhaust opening 38 and through a portion of the rotating heat wheel 46 while makeup air moves through the rotating heat wheel 46 and through makeup louver valve 45 and the makeup inlet air opening 39. Thus, the heat collected by the heat wheel from the air exhausted through the air exhaust opening is rotated around to the makeup air opening 39, and the incoming makeup air collects the heat from the heat wheel. Also, some of the moisture in the makeup air is absorbed by the heat wheel and is removed from the heat wheel by the exhaust air. Thus, heat wheel 46 functions as a heat transfer means for transferring some of the heat to a higher pressure and temperature and directed through pipe 70 to condenser 53 and through pipe 71 to the second condenser coil 64. Thus, the hot refrigerant fluid gives up a major portion of its heat to the dry air of heat recovery path 16 of the air duct system 14. The refrigerant fluid moving away from condenser coil 64 moves through pipe 72 to expansion valve 75 and into refrigerant-to-refrigerant heat exchanger 66, where it absorbs heat from the low temperature refrigeration sub-system 60.

Low temperature refrigeration sub-system 60 includes low pressure compressor 76 and high pressure compressor 78. The refrigerant fluid, such as R-22, is compressed by low pressure compressor 76 and moves through pipe 79 to the inlet of high pressure compressor 78, where it is compressed to a higher pressure and temperature, and pipe 80 directs the hot, high pressure refrigerant fluid to refrigerant-to-refrigerant heat exchanger 66 where it gives up a major portion of its heat to the first refrigeration system. The refrigerant of the second refrigeration system moves from heat exchanger 66 through pipe 81 to surplus heat coil 82 then from heat coil 82 through pipe 84 through expansion valve 85 and evaporator coil 30. The fan 83 of surplus heat coil 82 operates in response to a temperature control circuit. The fluid moves from evaporator coil 30 back through pipe 88 to the inlet of low pressure compressor 76. The hot, high pressure refrigerant fluid also moves from surplus heat coil 82 through expansion valve 90 and branch pipe 89, through evaporator 47, then through pipe 91 back to the inlet of high pressure compressor 78. The condensed moisture from evaporator 47 moves through its drain pipe 92 and through evaporator drain coil 26.

When in operation, the articles that have been painted are placed in the drying oven 11 and left to dry. The hot air moved to the drying oven tends to collect the solvent vapor from the articles and then move from the drying oven through the solvent and heat recovery system 10. Fans 95 and 96 in exhaust and makeup sections 41 and 42 of mixing chamber 36 causes a flow of air through the system. The saturated air leaves the drying oven at approximately 150° F. with a volume of approximately 6,000 specific cubic feet per minute, with 18 grains of water per pound of air and with 4.4 pounds of solvent per minute. The volume of solvent in the air flow is relatively lean and is generally considered non-combustible in this concentration. When the air has passed through the cross-flow heat exchangers 20 and 21 it will be at approximately 95.4° F. The air then moves through air coil 25. The fan 27 of the air coil 25 operates on demand in response to the temperature of the air moving through the outside air coil. The air in the heat extraction path 15 continues to move on through evaporator drain coil 26 and then through the second pair of cross-flow heat exchangers 28 and 29. The air entering the cross-flow heat exchangers 28 and 29 usually will be at about 95° F., and the air moving out of the second pair of cross-flow heat exchangers will be at approximately −5° F. to 5° F. but will have experienced an equivalent sensible heat reduction down to about −46° F. The difference in the equivalent sensible heat drop and the actual temperature of the air is a result of the partial condensation of the solvent as it passes through the cross-flow heat exchangers 28 and 29. Since both cross-flow heat exchangers 28 and 29 are sloped downwardly, any condensate in these to a higher pressure and temperature and directed through pipe 70 to condenser 53 and through pipe 71 to the second condenser coil 64. Thus, the hot refrigerant fluid gives up a major portion of its heat to the dry air of heat recovery path 16 of the air duct system 14. The refrigerant fluid moving away from condenser coil 64 moves through pipe 72 to expansion valve 75 and into refrigerant-to-refrigerant heat exchanger 66, where it absorbs heat from the low temperature refrigeration sub-system 60.

Low temperature refrigeration sub-system 60 includes low pressure compressor 76 and high pressure compressor 78. The refrigerant fluid, such as R-22, is compressed by low pressure compressor 76 and moves through pipe 79 to the inlet of high pressure compressor 78, where it is compressed to a higher pressure and temperature, and pipe 80 directs the hot, high pressure refrigerant fluid to refrigerant-to-refrigerant heat exchanger 66 where it gives up a major portion of its heat to the first refrigeration system. The refrigerant of the second refrigeration system moves from heat exchanger 66 through pipe 81 to surplus heat coil 82 then from heat coil 82 through pipe 84 through expansion valve 85 and 90 and evaporator coil 30. The fan 83 of surplus heat coil 82 operates in response to a temperature control circuit. The fluid moves from evaporator coil 30 back through pipe 88 to the inlet of low pressure compressor 76. The hot, high pressure refrigerant fluid also moves from surplus heat coil 82 through expansion valve 90 and branch pipe 89, through evaporator 47, then through pipe 91 back to the inlet of high pressure compressor 78. The condensed moisture from evaporator 47 moves through its drain pipe 92 and through evaporator drain coil 26.

When in operation, the articles that have been painted are placed in the drying oven 11 and left to dry. The hot air moved to the drying oven tends to collect the solvent vapor from the articles and then move from the drying oven through the solvent and heat recovery system 10. Fans 95 and 96 in exhaust and makeup sections 41 and 42 of mixing chamber 36 causes a flow of air through the system. The saturated air leaves the drying oven at approximately 150° F. with a volume of approximately 6,000 standard cubic feet per minute, with 6 grains of water per pound of air and with 4.4 pounds of solvent per minute. The volume of solvent in the air flow is relatively lean and is generally considered non-combustible in this concentration. When the air has passed through the cross-flow heat exchangers 20 and 21 it will be at approximately 95.4° F. The air then moves through air coil 25. The fan 27 of the air coil 25 operates on demand in response to the temperature of the air moving through the outside air coil. The air in the heat extraction path 15 continues to move on through evaporator drain coil 26 and then through the second pair of cross-flow heat exchangers 28 and 29. The air entering the cross-flow heat exchangers 28 and 29 usually will be at about 95° F., and the air moving out of the second pair of cross-flow heat exchangers will be at approximately −5° F. to 5° F. but will have experienced an equivalent sensible heat reduction down to about −46° F. The difference in the equivalent sensible heat drop and the actual temperature of the air is a result of the partial condensation of the solvent as it passes through the cross-flow heat exchangers 28 and 29. Since both cross-flow heat exchangers 28 and 29 are sloped downwardly, any condensate in these heat exchanges will continue to move with the direction of air flow to the opening 31 of the solvent storage tank 12. As the air continues to move on through evaporator 30, it will experience a heat reduction to approximately −60° F., whereupon substantially all of the solvent vapor will have been condensed and tends to drain into the opening 31 of the solvent storage tank or to be collected on the surfaces of demister 32 and drain into opening 31.

When the air leaves demister 32 it starts back through the heat recovery path of the air duct system 14 and enters the second pair of cross-flow heat exchangers 29, 28 at approximately 60° F. and picks up heat from the 95° air moving in the heat extraction path through the second pair of cross-flow heat exchangers 28, 29, so that the air moving in the heat recovery path exits the second pair of cross-flow heat exchangers at approximately 81.4° F. The air then moves into mixing chamber 36.

If no makeup air is being added to the system, the dried air moves through the open louver valve 40 to the evaporator 47 and the desiccant bed dryer 48. However, if makeup air is being added to the system, a portion of the dried air moves through control valve 40 while another portion is exhausted to the atmosphere through louver control valve 44. Heat wheel 46 tends to collect some of the heat from the exhaust air as it moves through air exhaust opening 38 and to give up this heat to the makeup air moving in through makeup inlet opening 39 and through the louver control valve 45. Also, a portion of the moisture in the makeup air is absorbed on the heat wheel and is removed therefrom by the exhaust air. The makeup air and the recycling air both move through evaporator 47 which tends to drop the temperature of the air to approximately 45° F., with the air having approximately 45 grains per pound of moisture, depending on the moisture content of the makeup air before it enters the system, and the air then moves through desiccant bed dryer 48. Upon being exhausted from desiccant bed dryer 48 the air is at approximately 90° F. with 3.5 grains per pound of water. The air moves from desiccant bed dryer 48 through the first pair of cross-flow heat exchangers 21 and 20, where it picks up heat from the heat extraction path and is exhausted from the cross-flow heat exchangers 21 and 20 at approximately 144° F. The air then moves through the coils of condenser 54 and is exhausted therefrom at approximately 180° F. at 3.5 grains of moisture per pound.

Usually a heat source, such as an electric induction heater, is present in oven 11, which can be used to control the temperature in the drying oven; however, the heat source can be a part of the solvent and heat recovery system as illustrated at 94.

Figure 3:
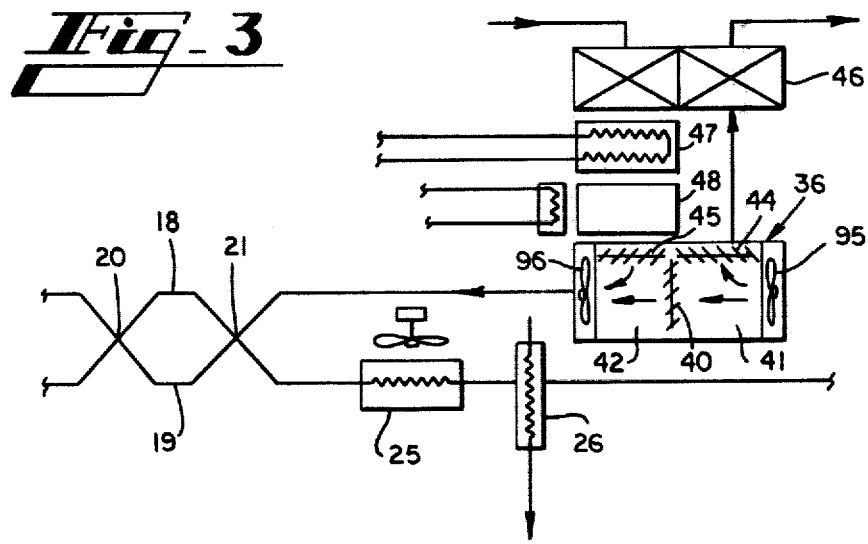
FIG. 3 is a partial schematic illustration, similar to FIG. 2, but showing a modified form of the invention.

FIG. 3 illustrates a modified form of the invention wherein the evaporator 47 and desiccant bed dryer 48 are positioned in the path of the makeup air, so that the recirculating air does not move through the evaporator or the desiccant bed dryer.

While this invention has been described in specific detail with particular reference to a preferred embodiment thereof, it will be understood that variations and modifications can be made within the spirit and scope of the invention as described hereinbefore and as defined in the appended claims.

I claim:

1. A process for recovering solvent and heat from hot solvent saturated air in drying ovens comprising the steps of:

moving the hot air with solvent vapors entrained therein from the drying oven through a plurality of cooling stages of a substantially closed air cycle including in sequence through a first pair of cross-flow heat exchangers, then progressively along a downwardly inclined path from the first pair of cross-flow heat exchangers through an air coil heat exchanger, through a water coil heat exchanger, through a second pair of cross-flow heat exchangers and about a refrigerant fluid evaporator to a demister, collecting the condensed solvent from the air at the evaporator and the demister at the end of the downwardly inclined path, moving the cool dry air through a plurality of heat transfer stages including in sequence from the demister back through the second pair of cross-flow heat exchangers, through the first pair of cross-flow heat exchangers, then about a refrigerant fluid condenser to the oven chamber.

2. The process of claim 1 and further including the step of exhausting a portion of the air from the air cycle as the air moves from the second pair of cross flow heat exchangers toward the first pair of cross flow heat exchangers, and introducing makeup air to the first pair of cross flow heat exchangers.

3. The process of claim 2 and wherein the steps of exhausting a portion of the air from the air cycle and introducing makeup air comprises moving the exhaust air through one side of a heat wheel and moving the makeup air through the other side of the heat wheel and rotating the heat wheel to transfer a portion of the heat of the exhaust air to the makeup air and transferring a portion of the incoming moisture to the exhaust air.

4. The process of claim 2 and further including the step of moving the makeup air through an evaporator and then through a desiccant bed dehumidifier prior to moving the makeup air through the first pair of cross-flow heat exchangers.

5. The process of claim 1 and further including moving hot refrigerant fluid of a first refrigeration circuit to the refrigerant fluid condenser and then through an expansion means to a refrigerant-to-refrigerant heat exchanger, and a moving hot refrigerant fluid of second refrigeration circuit to the refrigerant-to-refrigerant heat exchanger and then through an expansion means to the evaporator.

6. A process for recovering solvent and heat from hot solvent saturated air in drying ovens comprising the steps of:
   moving air and solvent vapor in a substantially closed circuit from the drying oven first in a heat extraction path through a series of cooling stages to condense the solvent from the air and then in a heat collection path in a cross flow heat exchange relationship through some of the cooling stages to recover some of the heat and back to the drying oven;
   moving a first refrigerant fluid through a condenser coil in the heat collection path to impart heat to the air and then through a refrigerant-to-refrigerant heat exchanger to absorb heat, and moving a second refrigerant fluid through the refrigerant-to-refrigerant heat exchanger to give up heat and then through an evaporator coil in the heat extraction path to absorb heat from the air;
   exhausting a portion of the dried air from the circuit and introducing makeup air from the atmosphere to the circuit, and
   moving the makeup air through the evaporator coil and then through a desiccant bed dryer.

7. A process for recovering solvent and heat from hot solvent saturated air in drying ovens comprising the steps of:
   moving air and solvent vapor in a substantially closed circuit from the drying oven first through a heat extraction path through a series of cooling stages to condense the solvent from the air and then in a heat collection path in a cross flow heat exchange relationship through some of the cooling stages to recover some of the heat and back to the drying oven,
   exhausting a portion of the dried air from the heat collection path and introducing makeup air to the heat collection path,
   moving a first refrigerant fluid through a condenser coil in the heat collection path to impart heat to the air and then through an expansion valve and to a refrigerant-to-refrigerant heat exchanger to absorb heat, and moving a second refrigerant fluid through the refrigerant-to-refrigerant heat exchanger to give up heat and then through an expansion valve and to an evaporator coil in the heat extraction path to absorb heat from the air and through an expansion valve to an evaporator coil in the path of the makeup air to condense moisture from the makeup air, and
   moving the makeup air through a desiccant bed dryer, and heating the desiccant bed of the desiccant bed dryer with the first refrigerant fluid.

8. Apparatus for recovering solvent and heat from a drying oven comprising:
   support platform including a solvent storage container,
   a substantially closed circuit air duct system for connection to a drying oven,
   said air duct system including a heat extraction path for communicating at one of its ends with the drying oven and extending in a downwardly sloped direction toward and communicating at its lower end with said solvent storage container of said support platform,
   said air duct system including a heat collection path communicating at one of its ends with said solvent storage container and extending in a cross flow heat exchange relationship with respect to said heat extraction path for communication at its other end with the drying oven,
   a compound multiple stage refrigeration system comprising a first sub-system in communication with a condenser coil positioned in said heat collection path adjacent the drying oven and in communication with a refrigerant-to-refrigerant heat exchanger whereby the refrigerant fluid of the first sub-system gives up heat at its condenser and absorbs heat at the refrigerant-to-refrigerant heat exchanger, and a second sub-system in communication with an evaporator coil positioned in said heat extraction path and in communication with said refrigerant-to-refrigerant heat exchanger whereby the refrigerant fluid of the second sub-system absorbs heat at its evaporator and gives up heat at the refrigerant-to-refrigerant heat exchanger, and
   means for exhausting a portion of the dried air from the circuit and for introducing makeup air to said heat collection path, the second sub-system of said multiple stage refrigeration system including an evaporation coil in the path of the makeup air to condense moisture from the makeup air.

* * * * *